(12) United States Patent
Kodama et al.

(10) Patent No.: US 7,934,779 B2
(45) Date of Patent: May 3, 2011

(54) VEHICLE AND CONTROL METHOD OF VEHICLE

(75) Inventors: Shinya Kodama, Susono (JP);
Michihito Shimada, Mishima (JP);
Kazuya Maki, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 744 days.

(21) Appl. No.: 11/798,852

(22) Filed: May 17, 2007

(65) Prior Publication Data

US 2007/0272457 A1 Nov. 29, 2007

(30) Foreign Application Priority Data

May 18, 2006 (JP) .................. 2006-138762

(51) Int. Cl.
*B60T 8/64* (2006.01)
*B60T 13/60* (2006.01)
(52) U.S. Cl. .......... 303/151; 303/152; 303/4; 303/115.3
(58) Field of Classification Search .................. 303/151, 303/152, 4, 114.3, 115.1, 115.3
See application file for complete search history.

(56) References Cited

U.S. PATENT DOCUMENTS

| | | | | |
|---|---|---|---|---|
| 4,738,112 A | * | 4/1988 | Nomura et al. ................. | 303/12 |
| 5,568,962 A | * | 10/1996 | Enomoto et al. ............. | 303/152 |
| 5,769,509 A | * | 6/1998 | Feigel et al. .................. | 303/152 |
| 5,882,093 A | * | 3/1999 | Enomoto et al. ............. | 303/152 |
| 5,895,100 A | * | 4/1999 | Ito et al. ........................ | 303/152 |
| 5,927,829 A | * | 7/1999 | Saga et al. .................... | 303/152 |
| 5,951,115 A | * | 9/1999 | Sakai et al. ................... | 303/152 |
| 6,070,954 A | * | 6/2000 | Urababa et al. ............... | 303/152 |
| 6,120,115 A | * | 9/2000 | Manabe ........................ | 303/152 |
| 7,284,803 B2 | * | 10/2007 | Matsuura et al. ............. | 303/152 |
| 2005/0143878 A1 | * | 6/2005 | Park et al. ..................... | 180/65.3 |
| 2005/0151420 A1 | * | 7/2005 | Crombez et al. ............. | 303/152 |

FOREIGN PATENT DOCUMENTS

| | | |
|---|---|---|
| DE | 699 19 648 T2 | 9/2005 |
| EP | 0 990 793 B1 | 8/2004 |
| JP | 2000-016278 A | 1/2000 |
| JP | 2001-177904 A | 6/2001 |
| JP | 2002-255018 A | 9/2002 |
| JP | 2004-182035 A | 7/2004 |
| JP | 2004-224119 A | 8/2004 |
| JP | 2004-231065 A | 8/2004 |
| JP | 2005-069136 A | 3/2005 |
| JP | 2005-075228 A | 3/2005 |
| JP | 2005-262997 A | 9/2005 |
| JP | 2006-096218 A | 4/2006 |

* cited by examiner

*Primary Examiner* — Thomas J Williams
(74) *Attorney, Agent, or Firm* — Kenyon & Kenyon LLP (57) ABSTRACT

In the hybrid vehicle of the invention, when the sum of a regenerative braking force BFr produced by a motor and an operational braking force BFpmc based on a master cylinder pressure Pmc is insufficient for a braking force demand BF* required by the driver in response to the driver's depression of a brake pedal, the motor and a brake actuator of an HBS are controlled to satisfy the braking force demand BF* by the total of the regenerative braking force BFr of the motor, the master cylinder pressure Pmc-based operational braking force BFpmc, and a compensated braking force BFpp based on a pressure increase by two pumps included in the brake actuator (steps S170 through S190).

10 Claims, 5 Drawing Sheets

VEHICLE AND CONTROL METHOD OF VEHICLE

BACKGROUND OF THE INVENTION

1. Field of the Invention

The present invention relates to a vehicle and a control method of the vehicle. More specifically the invention pertains to a vehicle equipped with an internal combustion engine that outputs power and with a motor that is capable of outputting at least a regenerative braking force to an axle of the vehicle, as well as to a control method of such a vehicle.

2. Description of the Related Art

The known structure of a prior art braking device for the vehicle includes a booster that utilizes a negative pressure produced by an internal combustion engine to amplify the driver's pedal force of a brake pedal, a master cylinder that produces a fluid pressure according to the driver's pedal force amplified by the booster, an electric pump as a hydraulic pressure generation source, and wheel cylinders that use the master cylinder and the electric pump as the hydraulic pressure source to apply a braking force to corresponding wheels (see, for example, Japanese Patent Laid-Open Gazette No. 2004-224119). In the prior art braking device of this known structure, a motor for the electric pump is actuated when the negative pressure produced by the internal combustion engine is lowered to or below a preset level. The actuated electric pump is used as the hydraulic pressure source to increase the pressure of the wheel cylinders. This structure ensures stable generation of the braking force against the driver's pedal force even in the event of a variation in driving state of the internal combustion engine. In another known structure of a prior art braking device capable of regenerative cooperation control for a hybrid vehicle, a pressure regulator regulates the liquid pressure, which is generated by a liquid pressure generator including an accumulator and a power-driven pump, according to the driver's pressing force of a brake pedal and outputs the regulated liquid pressure. A master cylinder is actuated by a supply of the liquid pressure to an auxiliary liquid pressure chamber. Both the output liquid pressures of the master cylinder and the pressure regulator are supplied to wheel cylinders, so as to apply a braking force to the wheels of the vehicle (see, for example, Japanese Patent Laid-Open Gazette No. 2004-182035).

SUMMARY OF THE INVENTION

In a hybrid vehicle equipped with both an internal combustion engine and a motor as the driving power source, the internal combustion engine may be stopped during a drive of the hybrid vehicle. In the case of application of the prior art braking device equipped with the booster utilizing the negative pressure of the internal combustion engine to the hybrid vehicle, the booster can not utilize the negative pressure at the stop of the internal combustion engine. In order to obtain an equivalent level of braking force during the stop of the internal combustion engine to the braking force during the operation of the internal combustion engine, the driver of this hybrid vehicle is required to step on the brake pedal with a sufficiently stronger pedal force. The driver may thus feel uncomfortable at the time of the braking operation.

In the vehicle of the invention and the control method of the vehicle, there is a need of preventing the driver from feeling uncomfortable at the time of a braking operation. In the vehicle of the invention and the control method of the vehicle, there is also a need of ensuring satisfaction of a braking force demand required by the driver.

In order to attain at least part of the above and the other related objects, the vehicle and control method of the vehicle have the configurations discussed below.

The present invention is directed to a vehicle. The vehicle includes: an internal combustion engine capable of outputting power; a motor capable of outputting at least a regenerative braking force to an axle of the vehicle; an accumulator unit that transmits electric power to and from the motor; a fluid pressure braking structure having a pressurization unit for pressurizing an operation fluid, the fluid pressure braking structure capable of outputting a braking force by utilizing an operational pressure of the operation fluid produced according to a driver's braking operation and a negative pressure produced by the internal combustion engine, and an increased pressure of the operation fluid produced by pressurization of the operation fluid by the pressurization unit; a braking force demand setting module that sets the braking force demand required by the driver in response to the driver's braking operation; and a braking control module that controls the motor and the fluid pressure braking structure to satisfy the set braking force demand by a total of the regenerative braking force and the operational braking force when a sum of the regenerative braking force produced by the motor and an operational braking force based on the operational pressure is sufficient for the braking force demand set in response to the driver's braking operation, the braking control module controlling the motor and the fluid pressure braking structure to satisfy the set braking force demand by a total of the regenerative braking force, the operational braking force, and a braking force based on the increased pressure of the operation fluid when the sum of the regenerative braking force produced by the motor and the operational braking force based on the operational pressure is insufficient for the braking force demand set in response to the driver's braking operation.

When the sum of the regenerative braking force produced by the motor and the operational braking force based on the operational pressure is sufficient for a braking force demand required by the driver and set in response to the driver's braking operation, the vehicle of the invention controls the motor and the fluid pressure braking structure to satisfy the set braking force demand by a total of the regenerative braking force and the operational braking force. When the sum of the regenerative braking force produced by the motor and the operational braking force based on the operational pressure is insufficient for the braking force demand set in response to the driver's braking operation, on the other hand, the vehicle of the invention controls the motor and the fluid pressure braking structure to satisfy the set braking force demand by a total of the regenerative braking force, the operational braking force, and a braking force based on the increased pressure of the operation fluid. The operational pressure of the operation fluid is produced according to the driver's braking operation and the negative pressure produced by the internal combustion engine. In the event of no generation of the negative pressure at a stop of the internal combustion engine or in the event of a decrease in negative pressure by any reason, the generated operational pressure is insufficiently low under application of an equivalent level of the driver's braking operation in the state of decreased negative pressure to the level of the driver's braking operation in the state of non-decreased negative pressure. The insufficient negative pressure may lead to dissatisfaction of the braking force demand by the sum of the regenerative braking force produced by the motor and the operational braking force based on the operational pressure. In such cases, the braking force based on the increased pressure of the operation fluid is additionally used to satisfy the braking force demand. Even when the level of the driver's braking operation in the state of decreased negative pressure is equivalent to the level of the driver's braking operation in the state of non-decreased negative pressure, such braking control ensures satisfaction of the braking force demand required by the driver. The vehicle of the invention thus desirably ensures satisfaction of the braking force demand required by the driver, while effectively preventing the driver from feeling uncomfortable at the time of the driver's braking operation in the state of decreased negative pressure.

In one preferable embodiment of the vehicle of the invention, the vehicle further includes: an operational pressure detection unit that detects the operational pressure; a negative pressure measurement unit that measures the negative pressure produced by the internal combustion engine; and a regenerative braking force setting module that sets a regenerative braking force obtainable by regeneration of the motor in response to the driver's braking operation. In the vehicle, the braking force demand setting module sets the braking force demand based on the detected operational pressure and the measured negative pressure, and the braking control module controls the pressurization unit based on a result of subtraction of the set regenerative braking force and an operational braking force based on the detected operational pressure from the set braking force demand. The vehicle of this aspect ensures accurate setting of the braking force demand required by the driver even in the event of a variation in negative pressure produced by the internal combustion engine. The vehicle of this aspect also adequately regulates the pressurization unit of the fluid pressure braking structure to satisfy the set braking force demand.

In another preferable embodiment of the vehicle of the invention, the regenerative braking force setting module sets the regenerative braking force obtainable by regeneration of the motor in response to the driver's braking operation based on a rotation speed of the motor and a state of charge of the accumulator unit. The vehicle of this aspect ensures adequate setting of the regenerative braking force producible by regeneration of the motor in response to the driver's braking operation and effectively uses the regenerative braking force produced by the motor. The effective use of the regenerative braking force desirably saves the energy required for pressurization of the operation fluid by the pressurization unit. The regeneration of the motor may be restricted according to the state of charge of the accumulator unit. Even when the regenerative braking force produced by regeneration of the motor decreases according to the state of charge of the accumulator unit, the vehicle of this aspect utilizes the braking force based on the increased pressure of the operation fluid to satisfy the braking force demand required by the driver.

In still another preferable embodiment of the vehicle of the invention, the fluid pressure braking structure includes an operational pressure production unit that produces the operational pressure of the operation fluid according to the driver's braking operation and the negative pressure produced by the internal combustion engine, and the pressurization unit pressurizes the operation fluid having the operational pressure generated by the operational pressure generation unit to increase the pressure of the operation fluid.

In still another preferable embodiment of the vehicle of the invention, the internal combustion engine is capable of outputting power to a first axle, and the motor is capable of inputting and outputting power from and to a second axle different from the first axle. The vehicle further includes: a connection disconnection structure that connects and disconnects an output shaft of the internal combustion engine to and from the first axle, and the connection disconnection structure disconnects the output shaft of the internal combustion engine from the first axle and an operation of the internal combustion engine is stopped when a predetermined condition is satisfied. The regenerative braking of the motor with the stopped operation of the internal combustion engine desirably enhances the energy efficiency of the vehicle. In the event of an insufficient level of the negative pressure at the stop of the internal combustion engine, the vehicle of this aspect ensures satisfaction of the braking force demand required by the driver even when the level of the driver's braking operation in the state of decreased negative pressure is equivalent to the level of the driver's braking operation in the state of non-decreased negative pressure. The vehicle of this aspect thus improves the operability and the safety in the braking state, while enhancing the energy efficiency.

The present invention is also directed to a control method of a vehicle. The vehicle includes: an internal combustion engine capable of outputting power; a motor capable of outputting at least a regenerative braking force to an axle of the vehicle; an accumulator unit that transmits electric power to and from the motor; and, a fluid pressure braking structure having a pressurization unit for pressurizing an operation fluid, the fluid pressure braking structure capable of outputting a braking force by utilizing an operational pressure of the operation fluid produced according to a driver's braking operation and a negative pressure produced by the internal combustion engine, and an increased pressure of the operation fluid produced by pressurization of the operation fluid by the pressurization unit. The control method includes the steps of: controlling the motor and the fluid pressure braking structure to satisfy the set braking force demand by a total of the regenerative braking force and the operational braking force when a sum of the regenerative braking force produced by the motor and an operational braking force based on the operational pressure is sufficient for the braking force demand set in response to the driver's braking operation, and controlling the motor and the fluid pressure braking structure to satisfy the set braking force demand by a total of the regenerative braking force, the operational braking force, and a braking force based on the increased pressure of the operation fluid when the sum of the regenerative braking force produced by the motor and the operational braking force based on the operational pressure is insufficient for the braking force demand set in response to the driver's braking operation.

According to the control method of the vehicle of the invention, the insufficient negative pressure may lead to dissatisfaction of the braking force demand by the sum of the regenerative braking force produced by the motor and the operational braking force based on the operational pressure. In such cases, the braking force based on the increased pressure of the operation fluid is additionally used to satisfy the braking force demand. Even when the level of the driver's braking operation in the state of decreased negative pressure is equivalent to the level of the driver's braking operation in the state of non-decreased negative pressure, such braking control ensures satisfaction of the braking force demand required by the driver. The control method of the vehicle of the invention thus desirably ensures satisfaction of the braking force demand required by the driver, while effectively preventing the driver from feeling uncomfortable at the time of the driver's braking operation in the state of decreased negative pressure.

In one preferable embodiment of the control method of the invention, the vehicle further includes: an operational pressure detection unit that detects the operational pressure; and a negative pressure measurement unit that measures the negative pressure produced by the internal combustion engine, the control method further comprising the steps of: setting a regenerative braking force obtainable by regeneration of the motor in response to the driver's braking operation, and setting the braking force demand based on the detected operational pressure and the measured negative pressure, and the controlling step controlling the pressurization unit based on a result of subtraction of the set regenerative braking force and an operational braking force based on the detected operational pressure from the set braking force demand.

The step of setting a regenerative braking force sets the regenerative braking force obtainable by regeneration of the motor in response to the driver's braking operation based on a rotation speed of the motor and a state of charge of the accumulator unit.

In another preferable embodiment of the control method of the invention, the fluid pressure braking structure includes an operational pressure production unit that produces the operational pressure of the operation fluid according to the driver's braking operation and the negative pressure produced by the internal combustion engine, and the pressurization unit pressurizes the operation fluid having the operational pressure generated by the operational pressure generation unit to increase the pressure of the operation fluid.

In another preferable embodiment of the control method of the invention, the internal combustion engine is capable of outputting power to a first axle, and the motor is capable of inputting and outputting power from and to a second axle different from the first axle. Further, the vehicle further includes a connection disconnection structure that connects and disconnects an output shaft of the internal combustion engine to and from the first axle, and the connection disconnection structure disconnects the output shaft of the internal combustion engine from the first axle and an operation of the internal combustion engine is stopped when a predetermined condition is satisfied.

DESCRIPTION OF THE PREFERRED EMBODIMENTS

One mode of carrying out the invention is described below as a preferred embodiment.

Figure 1:
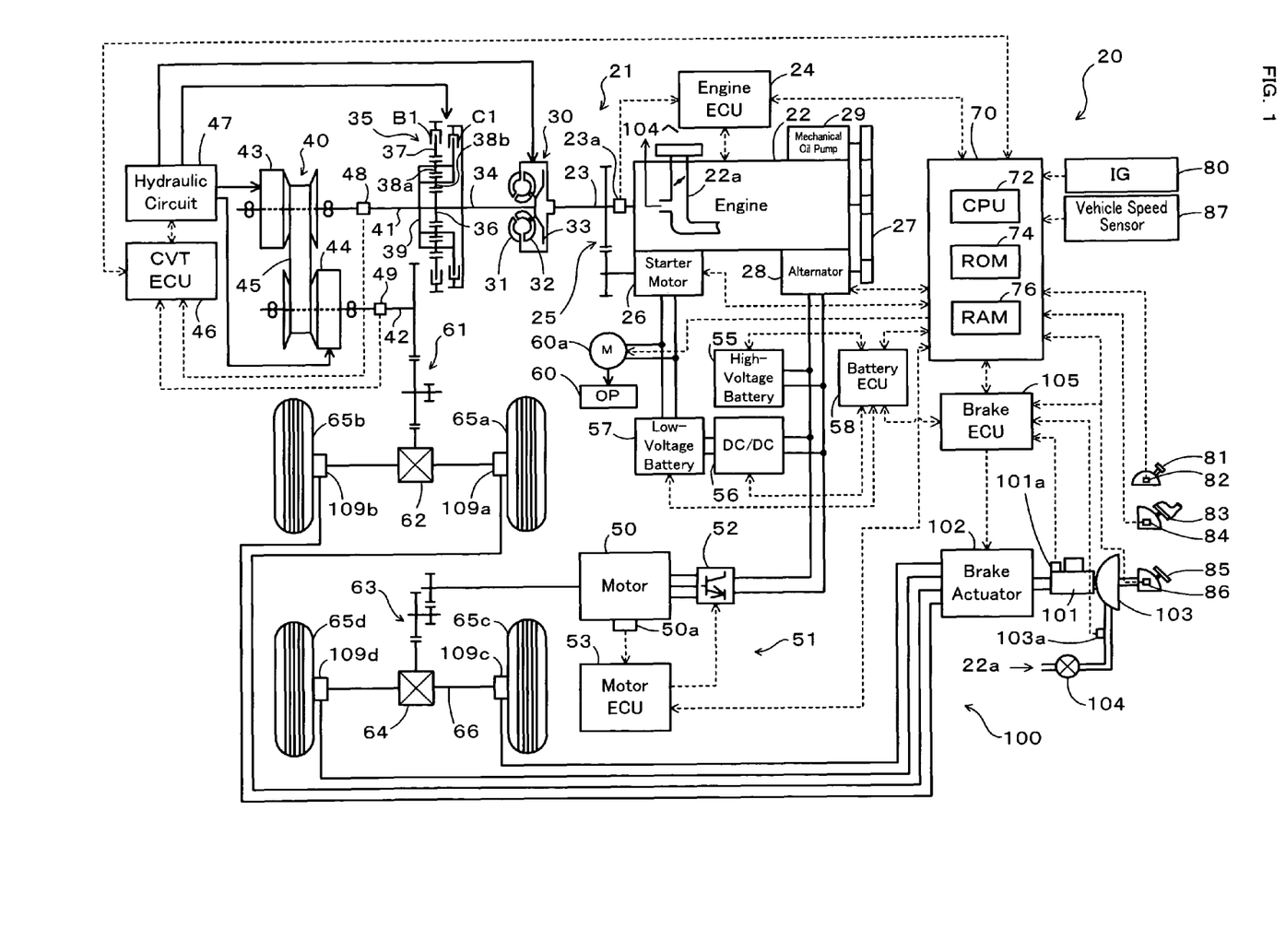
FIG. 1 schematically illustrates the configuration of a hybrid vehicle in one embodiment of the invention.

FIG. 1 schematically illustrates the configuration of a hybrid vehicle 20 of the invention. The hybrid vehicle 20 of the embodiment has a front wheel driving system 21 for transmission of output power of an engine 22 to front wheels 65a and 65b via a torque converter 30, a forward-backward drive switchover mechanism 35, a belt-driven continuously variable transmission (hereafter referred to as 'CVT') 40, a gear mechanism 61, and a differential gear 62, a rear wheel driving system 51 for transmission of output power of a motor 50 to rear wheels 65c and 65d via a gear mechanism 63, a differential gear 64, and a rear axle 66, an electronically controlled hydraulic braking system (hereafter referred to as 'HBS') 100 for application of braking force to the front wheels 65a and 65b and to the rear wheels 65c and 65d, and a hybrid electronic control unit (hereafter referred to as 'hybrid ECU') 70 for controlling the operations of the whole hybrid vehicle 20.

The engine 22 is an internal combustion engine that consumes a hydrocarbon fuel, such as gasoline or light oil, to output the power. A crankshaft 23 as an output shaft of the engine 22 is linked to the torque converter 30. The crankshaft 23 is also connected with a starter motor 26 via a gear train 25 and with an alternator 28 and a mechanical oil pump 29 via a belt 27. The engine 22 is driven and operated under control of an engine electronic control unit (hereafter referred to as 'engine ECU') 24. The engine ECU 24 receives input signals from various sensors measuring and detecting the operation conditions of the engine 22, for example, a crank position signal from a crank position sensor 23a attached to the crankshaft 23. The engine ECU 24 regulates the amount of fuel injection and the amount of intake air and adjusts the ignition timing, in response to these input signals. The engine ECU 24 makes communication with the hybrid ECU 70 to control the operation of the engine 22 in response to control signals from the hybrid ECU 70 and to output data regarding the operating conditions of the engine 22 to the hybrid ECU 70 according to the requirements.

The torque converter 30 of this embodiment is a fluid-type torque converter with a lockup clutch. The torque converter 30 includes a turbine runner 31 connected to the crankshaft 23 of the engine 22, a pump impeller 32 connected to an input shaft 41 of the CVT 40 via the forward-backward drive switchover mechanism 35, and a lockup clutch 33. The lockup clutch 33 is actuated by means of hydraulic pressure applied by a hydraulic circuit 47, which is driven and operated under control of a CVT electronic control unit (hereafter referred to as 'CVTECU') 46. The lockup clutch 33 locks up the turbine runner 31 and the pump impeller 32 of the torque converter 30 when required.

The forward-backward drive switchover mechanism 35 includes a double-pinion planetary gear mechanism, a brake B1, and a clutch C1. The double-pinion planetary gear mechanism includes a sun gear 36 as an external gear, a ring gear 37 as an internal gear arranged concentrically with the sun gear 36, multiple first pinion gears 38a engaging with the sun gear 36, multiple second pinion gears 38b engaging with the respective first pinion gears 38a and with the ring gear 37, and a carrier 39 connecting and holding the multiple first pinion gears 38a and the multiple second pinion gears 38b to allow both their revolutions and their rotations on their axes. The sun gear 36 and the carrier 39 are respectively linked to an output shaft 34 of the torque converter 30 and to the input shaft 41 of the CVT 40. The ring gear 37 of the planetary gear mechanism is fixed to a casing (not shown) via the brake B1. The on-off setting of the brake B1 freely prohibits and allows rotation of the ring gear 37. The sun gear 36 and the carrier 39 of the planetary gear mechanism are interconnected via the clutch C1. The on-off setting of the clutch C1 couples and decouples the sun gear 36 with and from the carrier 39. In the forward-backward drive switchover mechanism 35 of this structure, in the off position of the brake B1 and the on position of the clutch C1, the rotation of the output shaft 34 of the torque converter 30 is directly transmitted to the input shaft 41 of the CVT 40 to move the hybrid vehicle 20 forward. In the on position of the brake B1 and the off position of the clutch C1, the rotation of the output shaft 34 of the torque converter 30 is inverted to the reverse direction and is transmitted to the input shaft 41 of the CVT 40 to move the hybrid vehicle 20 backward. In the off positions of both the brake B1 and the clutch C1, the output shaft 34 of the torque converter 30 is decoupled from the input shaft 41 of the CVT 40.

The CVT 40 includes a primary pulley 43 of variable groove width linked to the input shaft 41, a secondary pulley 44 of variable groove width linked to an output shaft 42 or a driveshaft, and a belt 45 set in the grooves of the primary pulley 43 and the secondary pulley 44. The groove widths of the primary pulley 43 and the secondary pulley 44 are varied by the hydraulic pressure generated by the hydraulic circuit 47 under operation control of the CVTECU 46. Varying the groove widths enables the input power of the input shaft 41 to go through the continuously variable speed change and to be output to the output shaft 42. The groove widths of the primary pulley 43 and the secondary pulley 44 are varied to regulate the clamping force of the belt 45 for adjustment of the transmission torque capacity of the CVT 40, as well as to vary the change gear ratio. The hydraulic circuit 47 regulates the pressure and the flow rate of brake oil (operational fluid) fed by an electric oil pump 60, which is driven by a motor 60a, and by the mechanical oil pump 29, which is driven by the engine 22, and supplies the brake oil of the regulated pressure and flow rate to the primary pulley 43, the secondary pulley 44, the torque converter 30 (lockup clutch 33), the brake B1, and the clutch C1. The CVTECU 46 inputs a rotation speed Nin of the input shaft 41 from a rotation speed sensor 48 attached to the input shaft 41 and a rotation speed Nout of the output shaft 42 from a rotation speed sensor 49 attached to the output shaft 42. The CVTECU 46 generates and outputs driving signals to the hydraulic circuit 47, in response to these input data. The CVTECU 46 also controls on and off the brake B1 and the clutch C1 of the forward-backward drive switchover mechanism 35 and performs the lockup control of the torque converter 30. The CVTECU 46 makes communication with the hybrid ECU 70 to regulate the change gear ratio of the CVT 40 in response to control signals from the hybrid ECU 70 and to output data regarding the operating conditions of the CVT 40, for example, the rotation speed Nin of the input shaft 41 and the rotation speed Nout of the output shaft 42, to the hybrid ECU 70 according to the requirements.

The motor 50 is constructed as a known synchronous motor generator that may be actuated both as a generator and as a motor. The motor 50 is connected with the alternator 28, which is driven by the engine 22, via an inverter 52 and with a high-voltage battery 55 (for example, a secondary battery having a rated voltage of 42 V) having its output terminal linked to a power line from the alternator 28. The motor 50 is accordingly driven with electric power supplied from the alternator 28 or from the high-voltage battery 55 and generates regenerative electric power during deceleration to charge the high-voltage battery 55. The motor 50 is driven and operated under control of a motor electronic control unit (hereafter referred to as 'motor ECU') 53. The motor ECU 53 receives input signals required for the operation control of the motor 50, for example, signals from a rotational position detection sensor 50a that detects the rotational position of a rotor in the motor 50 and values of phase current for the motor 50 from a current sensor (not shown) The motor ECU 53 generates and outputs switching signals to switching elements included in the inverter 52, in response to these input signals. The motor ECU 53 makes communication with the hybrid ECU 70 to output switching control signals to the inverter 52 for the operation control of the motor 50 in response to control signals from the hybrid ECU 70 and to output data regarding the operating conditions of the motor 50 to the hybrid ECU 70 according to the requirements. The high-voltage battery 55 is connected with a low-voltage battery 57 via a DC-DC converter 56 having the function of voltage conversion. The electric power supplied from the high-voltage battery 55 goes through the voltage conversion by the DC-DC converter 56 and is transmitted to the low-voltage battery 57. The low-voltage battery 57 is used as the power source of various auxiliary machines including the electric oil pump 60. Both the high-voltage battery 55 and the low-voltage battery 57 are under management and control of a battery electronic control unit (hereafter referred to as 'battery ECU') 58. The battery ECU 58 computes remaining charge levels or states of charge (SOC) and input and output limits of the high-voltage battery 55 and the low-voltage battery 57, based on inter-terminal voltages from voltage sensors (not shown) attached to the respective output terminals (not shown) of the high-voltage battery 55 and the low-voltage battery 57, charge-discharge electric currents from current sensors (not shown), and battery temperatures from temperature sensors (not shown). The battery ECU 58 makes communication with the hybrid ECU 70 to output data regarding the conditions of the high-voltage battery 55 and the low-voltage battery 57, for example, their states of charge (SOC), to the hybrid ECU 70 according to the requirements.

The HBS 100 mounted on the hybrid vehicle 20 has a master cylinder 101, a brake actuator 102, and wheel cylinders 109a through 109d respectively provided for the front wheels 65a and 65b and the rear wheels 65c and 65d. The HBS 100 supplies a master cylinder pressure Pmc to the wheel cylinders 109a through 109d for the front wheels 65a and 65b and the rear wheels 65c and 65d via the brake actuator 102, so as to apply master cylinder pressure Pmc-based braking force to the front wheels 65a and 65b and the rear wheels 65c and 65d. The master cylinder pressure Pmc is generated by the master cylinder 101 as an operation pressure in response to the driver's depression of a brake pedal 85. In the HBS 100 of this embodiment, the master cylinder 101 is provided with a brake booster 103 that utilizes a negative pressure Pn produced by the engine 22 to assist the driver's braking operation. As shown in FIG. 1, the brake booster 103 is connected to an intake manifold 22a of the engine 22 via piping and a check valve 104 and works as a vacuum power-boosting device. The brake booster 103 utilizes the force applied to a diaphragm (not shown) due to a differential pressure between the outside air pressure and the negative intake pressure of the engine 22 and amplifies the driver's pressing force of the brake pedal 85. A piston (not shown) in the master cylinder 101 receives the driver's pressing force of the brake pedal 85 and the assist of negative pressure in the brake booster 103 and pressurizes the brake oil. The master cylinder 101 accordingly generates the master cylinder pressure Pmc corresponding to the driver's pressing force of the brake pedal 85 and the negative pressure Pn of the engine 22.

Figure 2:
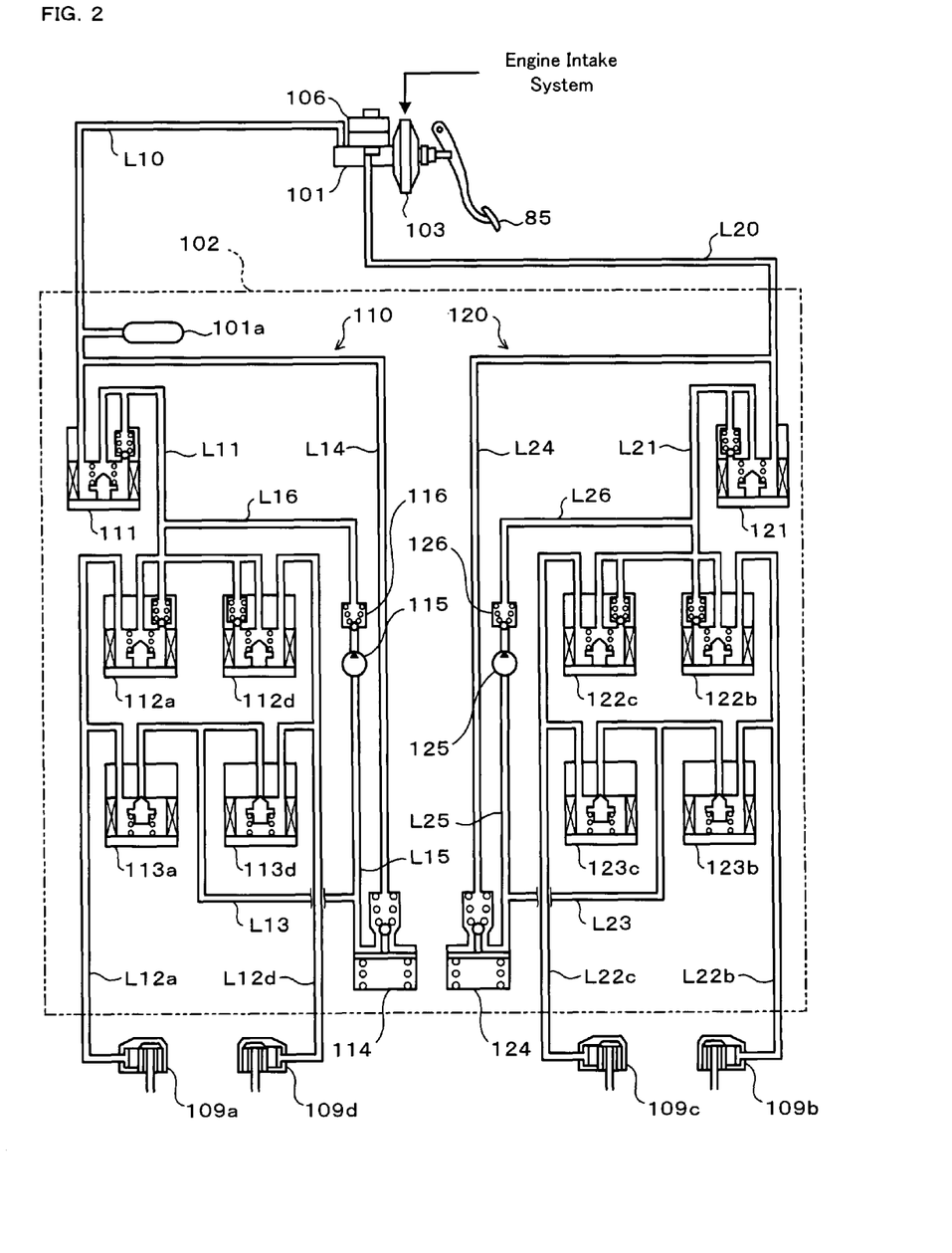
FIG. 2 is a schematic diagram showing the structure of a brake actuator in an HBS mounted on the hybrid vehicle of the embodiment.

The brake actuator 102 is actuated by the low-voltage battery 57 as the power source. The brake actuator 102 regulates the master cylinder pressure Pmc generated by the master cylinder 101 and supplies the regulated master cylinder pressure Pmc to the wheel cylinders 109a through 109d, while adjusting the hydraulic pressure in the wheel cylinders 109a through 109d to ensure application of braking force to the front wheels 65a and 65b and the rear wheels 65c and 65d regardless of the driver's pressing force of the brake pedal 85. FIG. 2 is a system diagram showing the structure of the brake actuator 102. As shown in FIG. 2, the brake actuator 102 is constructed in cross arrangement and has a first system 110 for the right front wheel 65a and the left rear wheel 65d and a second system 120 for the left front wheel 65b and the right rear wheel 65c. In the hybrid vehicle 20 of this embodiment, the engine 22 for driving the front wheels 65a and 65b is placed in the front portion of the vehicle body to give the front-deviated weight balance. The brake actuator 102 of the cross arrangement ensures application of braking force to at least one of the front wheels 65a and 65b even in the event of some failure in either the first system 110 or the second system 120. In this embodiment, the specification of the brake actuator 102 is determined to ensure application of the greater braking force to the front wheels 65a and 65b than the braking force applied to the rear wheels 65c and 65d, when the hydraulic pressure (wheel cylinder pressure) in the wheel cylinders 109a and 109b for the front wheels 65a and 65b is equal to the hydraulic pressure (wheel cylinder pressure) in the wheel cylinders 109c and 109d for the rear wheels 65c and 65d. The specification of the brake actuator 102 includes the friction coefficient of brake pads and the outer diameter of rotors in friction brake units, for example, disk brakes or drum brakes, which receive the hydraulic pressure from the wheel cylinders 109a through 109d to generate frictional braking force.

The first system 110 includes a master cylinder cut solenoid valve (hereafter referred to as 'MC cut solenoid valve') 111 connected with the master cylinder 101 via an oil supply path L10, and holding solenoid valves 112a and 112d linked to the MC cut solenoid valve 111 via an oil supply path L11 and respectively connected with the wheel cylinder 109a for the right front wheel 65a and with the wheel cylinder 109d for the left rear wheel 65d via pressure-varying oil paths L12a and L12d. The first system 110 also includes pressure reduction solenoid valves 113a and 113d respectively connected with the wheel cylinder 109a for the right front wheel 65a and with the wheel cylinder 109d for the left rear wheel 65d via the pressure-varying oil paths L12a and L12d, a reservoir 114 linked to the pressure reduction solenoid valves 113a and 113d via a pressure reduction oil path L13 and to the oil supply path L10 via an oil path L14, and a pump 115 having an inlet connected to the reservoir 114 via an oil path L15 and an outlet connected to the oil supply path L11 via an oil path L16 with a check valve 116. Similarly the second system 120 includes an MC cut solenoid valve 121 connected with the master cylinder 101 via an oil supply path L20, and holding solenoid valves 122b and 122c linked to the MC cut solenoid valve 121 via an oil supply path L21 and respectively connected with the wheel cylinder 109b for the left front wheel 65b and with the wheel cylinder 109c for the right rear wheel 65c via pressure-varying oil paths L22b and L22c. The second system 120 also includes pressure reduction solenoid valves 123b and 123c respectively connected with the wheel cylinder 109b for the left front wheel 65b and with the wheel cylinder 109c for the right rear wheel 65c via the pressure-varying oil paths L22b and L22c, a reservoir 124 linked to the pressure reduction solenoid valves 123b and 123c via a pressure reduction oil path L23 and to the oil supply path L20 via an oil path L24, and a pump 125 having an inlet connected to the reservoir 124 via an oil path L25 and an outlet connected to the oil supply path L21 via an oil path L26 with a check valve 126.

The MC cut solenoid valve 111, the holding solenoid valves 112a and 112d, the pressure reduction solenoid valves 113a and 113d, the reservoir 114, the pump 115, and the check valve 116 included in the first system 110 respectively correspond to and are identical with the MC cut solenoid valve 121, the holding solenoid valves 122b and 122c, the pressure reduction solenoid valves 123b and 123c, the reservoir 124, the pump 125, and the check valve 126 included in the second system 120. Each of the MC cut solenoid valves 111 and 121 is a linear solenoid valve that is full open in the power cut-off condition (off position) and has the opening adjustable by regulation of the electric current supplied to a solenoid. Each of the holding solenoid valves 112a, 112d, 122b, and 122c is a normally-open solenoid valve that is closed in the power supply condition (on position). Each of the holding solenoid valves 112a, 112d, 122b, and 122c has a check valve activated to return the flow of brake oil to the oil supply path L11 or L21 when an oil pressure (wheel cylinder pressure) in the corresponding one of the wheel cylinders 109a through 109d is higher than the hydraulic pressure in the oil supply path L11 or L21 in the closed position of the holding solenoid valve 112a, 112d, 122b, or 122c under the power supply condition (on position). Each of the pressure reduction solenoid valves 113a, 113d, 123b, and 123c is a normally-closed solenoid valve that is opened in the power supply condition (on position). The pump 115 of the first system 110 and the pump 125 of the second system 120 respectively include a non-illustrated motor for driving (for example, a duty-controlled brushless DC motor). The pump 115 or 125 takes in and pressurizes the brake oil in the corresponding reservoir 114 or 124 and supplies the pressurized brake oil to the oil path L16 or L26.

The brake actuator 102 of the above construction has the operations described below. In the off position of all the MC cut solenoid valves 111 and 121, the holding solenoid valves 112a, 112d, 122b, and 122c, and the pressure reduction solenoid valves 113a, 113d, 123b, and 123c (in the state of FIG. 2), in response to the driver's depression of the brake pedal 85, the master cylinder 101 generates the master cylinder pressure Pmc corresponding to the driver's pressing force of the brake pedal 85 and the negative pressure Pn of the engine 22. The brake oil is then supplied to the wheel cylinders 109a through 109d via the oil supply paths L10 and L20, the MC cut solenoid valves 111 and 121, the oil supply paths L11 and L21, the holding solenoid valves 112a, 112d, 122b, and 122c, and the pressure-varying oil paths L12a, L12d, L22b, and L22c. The master cylinder pressure Pmc-based braking force is thus applied to the front wheels 65a and 65b and the rear wheels 65c and 65d. In response to the driver's subsequent release of the brake pedal 85, the brake oil in the wheel cylinders 109a through 109d is returned to a reservoir 106 of the master cylinder 101 via the pressure-varying oil paths L12a, L12d, L22b, and L22c, the holding solenoid valves 112a, 112d, 122b, and 122c, the oil supply paths L11 and L21, the MC cut solenoid valves 111 and 121, and the oil supply paths L10 and L20. This decreases the hydraulic pressure in the wheel cylinders 109a through 109d to release the braking force applied to the front wheels 65a and 65b and the rear wheels 65c and 65d. During application of the braking force to the front wheels 65a and 65b and the rear wheels 65c and 65d, the power supply to close the holding solenoid valves 112a, 112d, 122b, and 122c (on position) keeps the hydraulic pressure in the wheel cylinders 109a through 109d. The power supply to open the pressure reduction solenoid valves 113a, 113d, 123b, and 123c (on position) introduces the brake oil in the wheel cylinders 109a through 109d to the reservoirs 114 and 124 via the pressure-varying oil paths L12a, L12d, L22b, and L22c, the pressure reduction solenoid valves 113a, 113d, 123b, and 123c, and the pressure reduction oil paths L13 and L23 to reduce the wheel cylinder pressure in the wheel cylinders 109a through 109d. The brake actuator 102 accordingly attains antilock braking (ABS) control to prevent a skid of the hybrid vehicle 20 due to the lock of any of the front wheels 65a and 65b and the rear wheels 65c and 65d in response to the driver's depression of the brake pedal 85.

On the driver's depression of the brake pedal 85, the brake actuator 102 actuates the pumps 115 and 125 with reduction of the openings of the MC cut solenoid valves 111 and 112 to introduce the brake oil from the master cylinder 101 to the reservoirs 114 and 124. The brake oil introduced from the master cylinder 101 to the reservoirs 114 and 124 has the pressure increased by the pumps 115 and 125 and is fed to the wheel cylinders 109a through 109d via the oil paths L16 and L26, the holding solenoid valves 112a, 112d, 122b, and 122c, and the pressure-varying oil paths L12a, L12d, L22b, and L22c. Actuation of the pumps 115 and 125 simultaneously with the opening adjustment of the MC cut solenoid valves 111 and 121 attains the braking assist and gives the braking force as the sum of the master cylinder pressure Pmc and the pressure increase by the pumps 115 and 125. Even in the state of the driver's release of the brake pedal 85, actuation of the pumps 115 and 125 simultaneously with the opening adjustment of the MC cut solenoid valves 111 and 121 enables the brake oil introduced from the reservoir 106 of the master cylinder 101 to the reservoirs 114 and 124 of the brake actuator 102 to be pressurized by the pumps 115 and 125 and to be fed to the wheel cylinders 109a through 109d. The individual on-off control of the holding solenoid valves 112a, 112d, 122b, and 122c and the pressure reduction solenoid valves 113a, 113d, 123b, and 123c individually and freely regulates the pressure in each of the wheel cylinders 109a through 109d. The brake actuator 102 thus attains traction control (TRC) to prevent a skid of the hybrid vehicle 20 due to the wheelspin of any of the front wheels 65a and 65b and the rear wheels 65c and 65d in response to the driver's depression of the accelerator pedal 83. The brake actuator 102 also attains attitude stabilization control (VSC) to prevent a sideslip of any of the front wheels 65a and 65b and the rear wheels 65c and 65d, for example, during a turn of the hybrid vehicle 20.

The brake actuator 102 is driven and operated under control of a brake electronic control unit (hereafter referred to as 'brake ECU') 105. More specifically the brake ECU 105 controls the operations of the MC cut solenoid valves 111 and 121, the holding solenoid valves 112a, 112d, 122b, and 122c, the pressure reduction solenoid valves 113a, 113d, 123b, and 123c, and the motor 150 for actuating the pumps 115 and 125. The brake ECU 105 inputs the master cylinder pressure Pmc generated by the master cylinder 101 and measured by a master cylinder pressure sensor 101a, a negative pressure Pn in the brake booster 103 produced by the engine 22 and measured by a pressure sensor 103a, a signal from a pedal force detection switch 86 attached to the brake pedal 85 and mainly used in the event of a failure of the brake actuator 102, wheel speeds from respective wheel speed sensors (not shown) placed on the front wheels 65a and 65b and the rear wheels 65c and 65d, and a steering angle from a steering angle sensor (not shown). The brake ECU 105 makes communication with the hybrid ECU 70, the motor ECU 53, and the battery ECU 58. The brake ECU 105 controls the operation of the brake actuator 102 according to the input data including the master cylinder pressure Pmc and the negative pressure Pn, the state of charge (SOC) of the high-voltage battery 55, a rotation speed Nm of the motor, and control signals from the hybrid ECU 70, so as to attain the braking assist, the ABS control, the TRC, and the VSC. The brake ECU 105 outputs the operating conditions of the brake actuator 102 to the hybrid ECU 70, the motor ECU 53, and the battery ECU 58 according to the requirements.

The hybrid ECU 70 is constructed as a microprocessor including a CPU 72, a ROM 74 that stores processing programs, a RAM 76 that temporarily stores data, input and output ports (not shown), and a communication port (not shown). The hybrid ECU 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a signal from the pedal force detection switch 86, and a vehicle speed V from a vehicle speed sensor 87. The hybrid ECU 70 generates diverse control signals in response to these input signals and transmits control signals and data to and from the engine ECU 24, the CVTECU 46, the motor ECU 53, the battery ECU 58, and the brake ECU 105 by communication. The hybrid ECU 70 outputs, via its output port, for example, driving signals to the starter motor 26 and the alternator 28 linked to the crankshaft 23 and control signals to the motor 60a for the electric oil pump 60.

In response to the driver's operation of the accelerator pedal 83, the hybrid vehicle 20 of the embodiment may be driven with the output power of the engine 22 transmitted to the front wheels 65a and 65b, with the output power of the motor 50 transmitted to the rear wheels 65c and 65d, or with both the output power of the engine 22 and the output power of the motor 50 as the four-wheel drive. The hybrid vehicle 20 is driven by the four-wheel drive, for example, in the event of abrupt acceleration by the driver's heavy depression of the accelerator pedal 83 or in the event of a skid or slip of any of the front wheels 65a and 65b and the rear wheels 65c and 65d. When the driver releases the accelerator pedal 83 to give an accelerator off-based speed reduction requirement at the vehicle speed V of not lower than a predetermined level, the hybrid vehicle 20 of the embodiment sets both the brake B1 and the clutch C1 off to decouple the engine 22 from the CVT 40, stops the operation of the engine 22, and performs the regenerative control of the motor 50. The regenerative control of the motor 50 applies the braking force to the rear wheels 65c and 65d to decelerate the hybrid vehicle 20. The regenerative electric power generated by the motor 50 during deceleration may be used to charge the high-voltage battery 55. This arrangement desirably enhances the energy efficiency in the hybrid vehicle 20.

Figure 3:
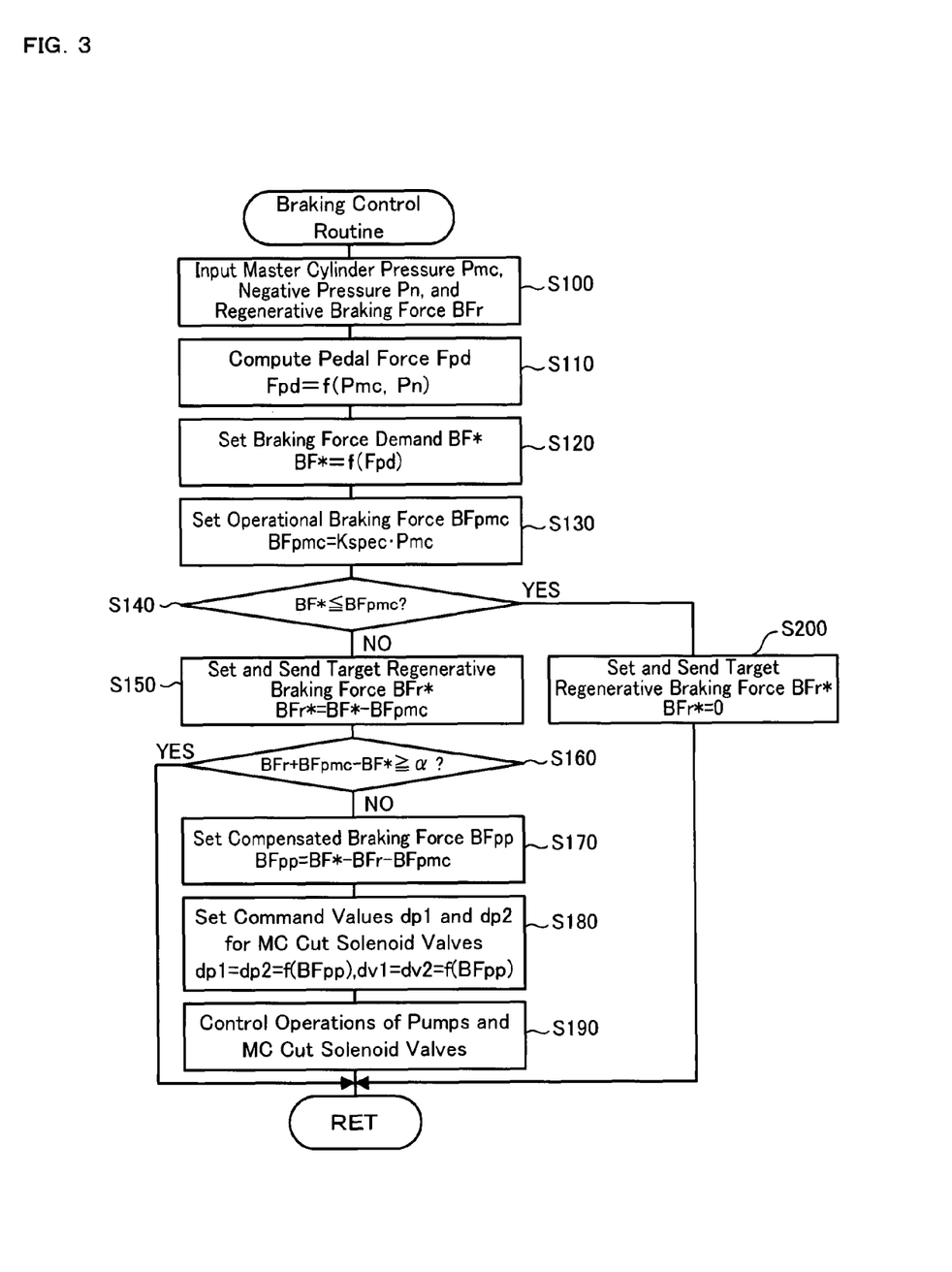
FIG. 3 is a flowchart showing a braking control routine executed by a brake ECU in the hybrid vehicle of the embodiment.

The following describes the operations in the hybrid vehicle 20 of the embodiment having the above configuration, especially a series of braking control in response to the driver's depression of the brake pedal 85. FIG. 3 is a flowchart showing a braking control routine executed by the brake ECU 105 in the hybrid vehicle 20 of the embodiment. This braking control routine is repeatedly executed at preset time intervals, for example, at every several msec, during the driver's depression of the brake pedal 85.

Figure 4:
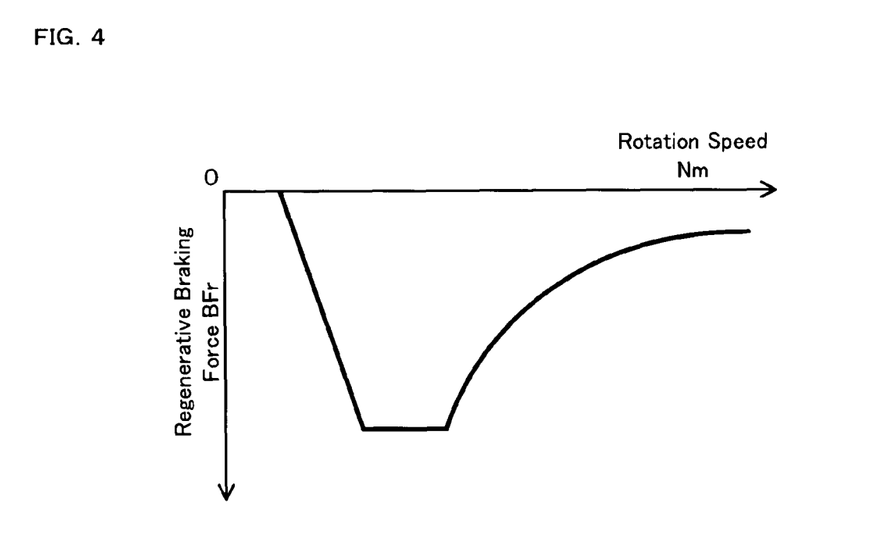
FIG. 4 shows one example of a regenerative braking force computation map.

On the start of the braking control routine shown in FIG. 3, a CPU (not shown) of the brake ECU 105 first inputs required data for control, that is, the master cylinder pressure Pmc from the master cylinder pressure sensor 101a, the negative pressure Pn from the pressure sensor 103a, and a regenerative braking force BFr obtained by regeneration of the motor 50 (step S100). The regenerative braking force BFr obtained by regeneration of the motor 50 is set corresponding to the rotation speed Nm of the motor 50 and the state of charge SOC of the high-voltage battery 55 and is received from the hybrid ECU 70 by communication. In this embodiment, a relation between the regenerative braking force BFr and the rotation speed Nm of the motor 50 is specified in advance with regard to each charge level or state of charge SOC of the high-voltage battery 55, based on the rated regenerative torque of the motor 50. The specified relation is stored as a regenerative braking force computation map in the ROM 74 of the hybrid ECU 70. One example of the regenerative braking force computation map is shown in FIG. 4. The hybrid ECU 70 selects a regenerative braking force computation map corresponding to the state of charge SOC of the high-voltage battery 55 input from the battery ECU 58 at every preset time interval and reads the regenerative braking force BFr corresponding to the given rotation speed Nm of the motor 50 from the selected regenerative braking force computation map. The regenerative braking force BFr input at step S100 is thus basically the value sampled immediately before the input.

Figure 5:
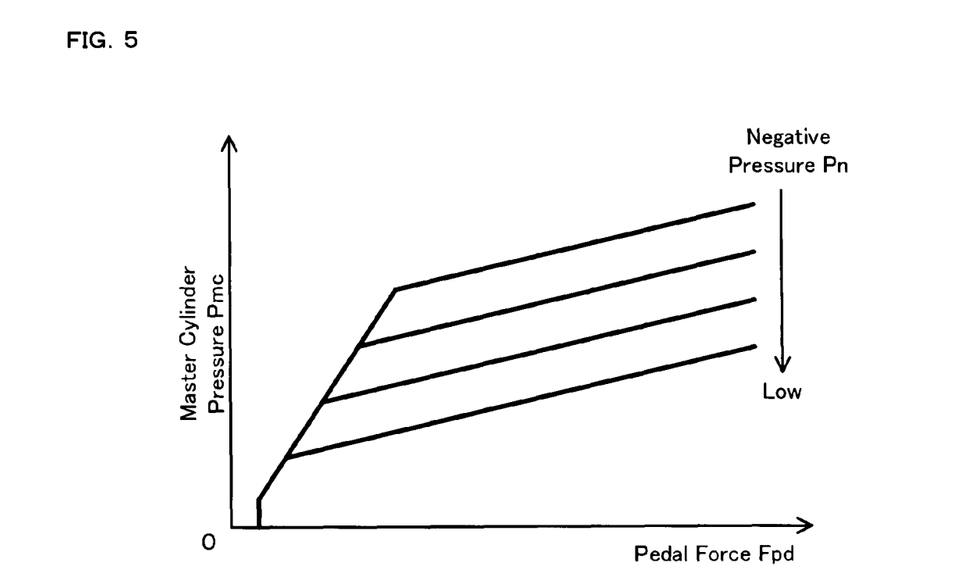
FIG. 5 shows one example of a pedal force setting map.
Figure 6:
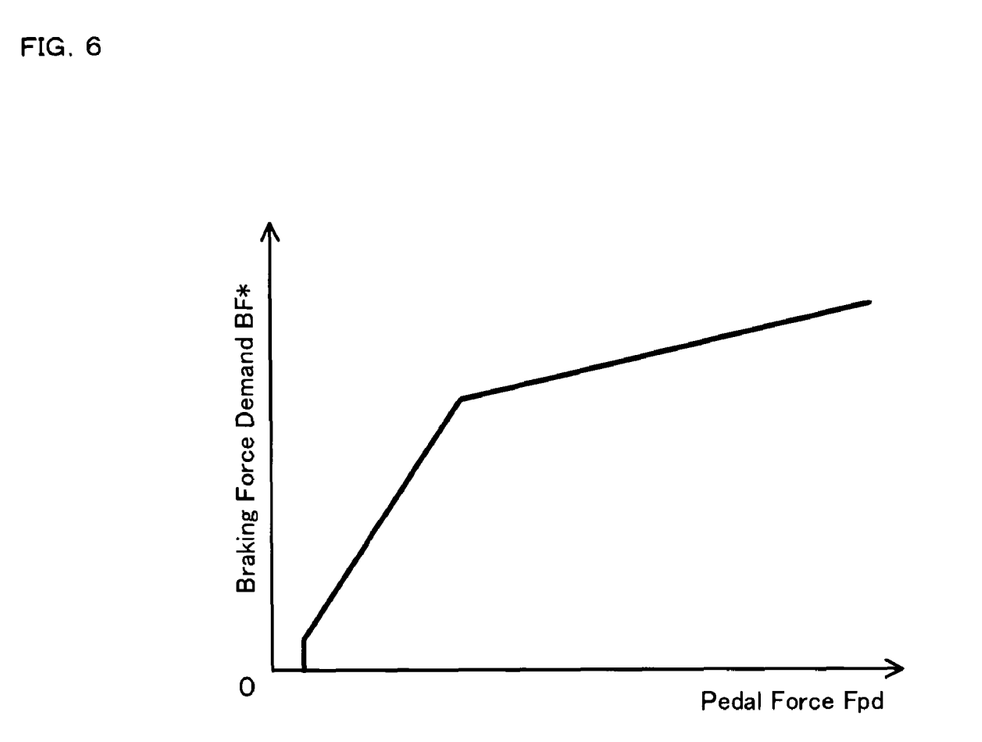
FIG. 6 shows one example of a braking force demand setting map.

After the data input at step S100, the CPU computes a pedal force Fpd applied by the driver's depression of the brake pedal 85 from the input master cylinder pressure Pmc and the input negative pressure Pn (step S110). The procedure of this embodiment prepares and stores in advance variations in pedal force Fpd against the master cylinder pressure Pmc and the negative pressure Pn as a pedal force setting map in a ROM (not shown) of the brake ECU 105 and reads the pedal force Fpd corresponding to the given master cylinder pressure Pmc and the given negative pressure Pn from the pedal force setting map. FIG. 5 shows one example of the pedal force setting map. The CPU subsequently sets a braking force demand BF* as the driver's requirement from the set pedal force Fpd (step S120). The procedure of this embodiment prepares and stores in advance a variation in braking force demand BF* against the driver's pedal force Fpd as a braking force demand setting map in the ROM of the brake ECU 105 and reads the braking force demand BF* corresponding to the given pedal force Fpd from the braking force demand setting map. FIG. 6 shows one example of the braking force demand setting map. The servo ratio in the brake booster 103 varies with a variation in negative pressure Pn applied from the engine 22 to the brake booster 103. By taking into account this variation, the braking control of this embodiment computes the pedal force Fpd given by the driver's depression of the brake pedal 85 according to the master cylinder pressure Pmc and the negative pressure Pn and sets the braking force demand BF* corresponding to the computed pedal force Fpd. This enables accurate setting of the braking force demand BF* corresponding to the driver's requirement even in the event of a variation in negative pressure Pn applied from the engine 22 to the brake booster 103.

The master cylinder pressure Pmc input at step S100 is multiplied by a constant Kspec to set a master cylinder pressure Pmc-based operational braking force BFpmc (step S130). The constant Kspec is determined according to the braking specification including the outer diameter of the brake rotors, the diameter of the wheels, the sectional area of the wheel cylinders, and the friction coefficient of the brake pads. The braking force demand BF* computed at step S120 is compared with the operational braking force BFpmc set at step S130 (step S140). When the braking force demand BF* is not greater than the operational braking force BFpmc, the master cylinder pressure Pmc-based operational braking force BFpmc is sufficient to satisfy the driver's required braking force. When the braking force demand BF* is not greater than the operational braking force BFpmc (step S140: yes), the CPU sets a value '0' to a target regenerative braking force BFr* that is to be obtained by regeneration of the motor 50 and sends the setting of the target regenerative braking force BFr* to the motor ECU 53 (step S200). The CPU then terminates this braking control routine. In this case, the master cylinder pressure Pmc-based operational braking force BFpmc is directly transmitted to the front wheels 65a and 65b and to the rear wheels 65c and 65d. The MC cut solenoid valves 111 and 121 are thus set in the off position to be kept full open.

When the braking force demand BF* exceeds the operational braking force BFpmc, on the other hand, the master cylinder pressure Pmc-based operational braking force BFpmc is insufficient to satisfy the driver's required braking force. When the braking force demand BF* is greater than the operational braking force BFpmc (step S140: no), the CPU sets the result of subtraction of the operational braking force BFpmc set at step S130 from the braking force demand BF* computed at step S120 to the target regenerative braking force BFr* that is to be obtained by regeneration of the motor 50 and sends the setting of the target regenerative braking force BFr* to the motor ECU 53 (step S150). The regenerative braking force producible by regeneration of the motor 50 varies according to the rotation speed Nm of the motor 50 (that is, the vehicle speed V) and the state of charge SOC of the high-voltage battery 55. The target regenerative braking force BFr* set and sent at step S150 is not always coverable by the output from the motor 50. Under some conditions, the output of the motor 50 may be less than the target regenerative braking force BFr* and fail to satisfy the braking force demand BF* required by the driver. After sending the setting of the target regenerative braking force BFr* at step S150, the CPU determines whether the result of subtraction of the braking force demand BF* computed at step S120 from the sum of the regenerative braking force BFr input at step S100 and the operational braking force BFpmc set at step S130 is not less than a predetermined threshold value $\alpha$ (step S160). The threshold value $\alpha$ is determined experimentally and analytically by taking into account a variation in regenerative braking force during the driver's braking operation and is, for example, a positive value approximate to 0. In the case of an affirmative answer at step S160, the motor 50 is capable of outputting the target regenerative braking force BFr*. Namely the braking force demand BF* is satisfied by the sum of the master cylinder pressure Pmc-based operational braking force BFpmc and the regenerative braking force produced by the motor 50. The CPU then exits from the braking control routine of FIG. 3. The motor ECU 53 receives the target regenerative braking force BFr* and performs switching control of switching elements included in the inverter 52 to enable output of the target regenerative braking force BFr* from the motor 50. In this state, the master cylinder pressure Pmc-based operational braking force BFpmc is directly transmitted to the front wheels 65a and 65b and to the rear wheels 65c and 65d. The MC cut solenoid valves 111 and 121 are thus set in the off position to be kept full open.

In the case of a negative answer at step S160, on the other hand, the regenerative braking force actually output from the motor 50 is less than the target regenerative braking force BFr*. The output of the motor 50 may thus fail to satisfy the braking force demand BF* required by the driver. When BFr+BFpmc−BF* is less than the predetermined threshold value $\alpha$ (step S160: no), the result of subtraction of the regenerative braking force BFr input at step S100 and the operational braking force BFpmc set at step S130 from the braking force demand BF* computed at step S120 is set to a compensated braking force BFpp, which is based on a pressure increase induced by pressurization of the brake oil by the pumps 115 and 125 (step S170). The pumps 115 and 125 are actuated and controlled to pressurize the brake oil fed from the master cylinder 101 and thereby compensate for a potential insufficiency of braking force. After setting the compensated braking force BFpp, the CPU sets a command value dp1 (duty ratio command value) for the motor of the pump 115, a command value dp2 (duty ratio command value) for the motor of the pump 125, a command value dv1 (duty ratio command value) for varying the opening of the MC cut solenoid valve 111, and a command value dv2 (duty ratio command value) for varying the opening of the MC cut solenoid valve 121, based on the compensated braking force BFpp (step S180). In this embodiment, variations in command values dp1 and dp2 and variations in command values dv1 and dv2 against the compensated braking force BFpp or the pressure increase by the pumps 115 and 125 are specified and stored in advance as command value setting maps (not shown) in the ROM of the brake ECU 105. The command values dp1 and dp2 and the command values dv1 and dv2 are read corresponding to the given compensated braking force BFpp from these command value setting maps. The operation of the motors for the pumps 115 and 125 and the operation of the solenoids of the MC cut solenoid valves 111 and 121 are controlled respectively with the command values dp1 and dp2 and with the command values dv1 and dv2 (step S190). The CPU then exits from the braking control routine of FIG. 3. In this state, in addition to the regenerative braking force produced by the motor 50, the sum of the braking force based on the master cylinder pressure Pmc from the wheel cylinders 109a through 109d and the braking force based on the pressure increase by the pumps 115 and 125, that is, the sum of the operational braking force BFpmc and the compensated braking force BFpp, is transmitted to the front wheels 65a and 65b and to the rear wheels 65c and 65d.

In the hybrid vehicle 20 of the embodiment described above, under general conditions, the braking force demand BF* required by the driver in response to the driver's depression of the brake pedal 85 is satisfied by the sum of the regenerative braking force BFr produced by the motor 50 and the master cylinder pressure Pmc-based operational braking force BFpmc. In this case, the motor 50 and the brake actuator 102 of the HBS 100 are controlled to satisfy the braking force demand BF* by the sum of the regenerative braking force BFr of the motor 50 and the operational braking force BFpmc. Under some conditions, however, the braking force demand BF* required by the driver in response to the driver's depression of the brake pedal 85 may not be satisfied by the sum of the regenerative braking force BFr produced by the motor 50 and the master cylinder pressure Pmc-based operational braking force BFpmc. In such cases, the motor 50 and the brake actuator 102 of the HBS 100 are controlled to satisfy the braking force demand BF* by the sum of the regenerative braking force BFr of the motor 50, the operational braking force BFpmc, and the compensated braking force BFpp based on the pressure increase by the pumps 115 and 125 (steps S170 to S190 in the braking control routine of FIG. 3). In the HBS 100 of the embodiment, the master cylinder 101 equipped with the brake booster 103 generates the master cylinder pressure Pmc according to the driver's pedal force Fpd (the driver's braking operation) and the negative pressure Pn generated by the engine 22. In the event of no generation of the negative pressure Pn at stop of the engine 22 or in the event of a decrease in negative pressure Pn (increased absolute value) by any reason, the generated master cylinder pressure Pmc is insufficiently low under application of an equivalent level of the driver's pedal force Fpd in the state of decreased negative pressure to the pedal force Fpd in the state of non-decreased negative pressure. The insufficient negative pressure Pn may lead to dissatisfaction of the braking force demand BF* by the sum of the regenerative braking force BFr of the motor 50 and the master cylinder pressure Pmc-based operational braking force BFpmc. In such cases, the compensated braking force BFpp based on the pressure increase by the pumps 115 and 125 is additionally used to satisfy the braking force demand BF*. Even when the driver's pedal force Fpd in the state of decreased negative pressure is equivalent to the pedal force Fpd in the state of non-decreased negative pressure, such braking control ensures satisfaction of the braking force demand BF* required by the driver. The hybrid vehicle 20 of the embodiment thus desirably ensures satisfaction of the braking force demand BF* required by the driver, while effectively preventing the driver from feeling uncomfortable at the time of the driver's braking operation in the state of decreased negative pressure.

The braking control of the embodiment sets the braking force demand BF*, based on the master cylinder pressure Pmc measured by the master cylinder pressure sensor 101a and the negative pressure Pn measured by the pressure sensor 103a (steps S110 and S120). This arrangement ensures accurate setting of the braking force demand BF* required by the driver even in the event of a variation in negative pressure Pn applied from the engine 22 to the brake booster 103. The compensated braking force BFpp is calculated by subtracting the master cylinder pressure Pmc-based operational braking force BFpmc and the regenerative braking force BFr (previous value) of the motor 50 from the current setting of the braking force demand BF*. The operations of the pumps 115 and 125 and the operations of the MC cut solenoid valves 111 and 121 are appropriately controlled with the updated setting of the compensated braking force BFpp, so as to satisfy the braking force demand BF* required by the driver.

In the hybrid vehicle 20 of the embodiment, the hybrid ECU 70 sets the regenerative braking force BFr that is to be produced by regeneration of the motor 50, based on the rotation speed Nm of the motor 50 and the charge level or the state of charge SOC of the high-voltage battery 55. The motor 50 then performs regenerative control in response to the driver's depression of the brake pedal 85 to produce an adequate level of regenerative braking force. This arrangement desirably saves the power consumption of the motors for actuating the pumps 115 and 125. The regeneration of the motor 50 may be restricted according to the state of charge SOC of the high-voltage battery 55. Even when the regenerative braking force BFr produced by regeneration of the motor 50 decreases according to the state of charge SOC of the high-voltage battery 55, the braking control of the embodiment utilizes the compensated braking force BFpp based on the pressure increase by the pumps 115 and 125 to satisfy the braking force demand BF* required by the driver.

An accelerator release-based deceleration demand is given by the driver's release of the accelerator pedal 83 at the vehicle speed V of not lower than a predetermined level. In response to this accelerator release-based deceleration demand, the hybrid vehicle 20 of the embodiment disconnects the engine 22 from the CVT 40, stops the operation of the engine 22, and performs regenerative control of the motor 50. The regenerative braking of the motor 50 with the stopped operation of the engine 22 desirably enhances the energy efficiency of the hybrid vehicle 20. As mentioned above, in the event of an insufficient level of the negative pressure Pn at the stop of the engine 22, the hybrid vehicle 20 of the embodiment ensures satisfaction of the braking force demand BF* required by the driver even when the driver's pedal force Fpd in the state of decreased negative pressure is equivalent to the pedal force Fpd in the state of non-decreased negative pressure. The hybrid vehicle 20 of the embodiment thus improves the operability and the safety in the braking state, while enhancing the energy efficiency.

The embodiment discussed above is to be considered in all aspects as illustrative and not restrictive. There may be many modifications, changes, and alterations without departing from the scope or spirit of the main characteristics of the present invention.

The brake actuator 102 included in the HBS 100 of the embodiment may have a pressure accumulator or pressure reservoir. The pumps 115 and 125 of the brake actuator 102 may have individual driving sources or a common driving source, for example, one single motor. In the hybrid vehicle 20 of the embodiment, the power of the engine 22 is transmitted to the front wheels 65a and 65b via the output shaft 42 or the driveshaft. The power of the engine 22 may alternatively be transmitted to the rear wheels 65c and 65d via the rear axle 66. The power of the engine 22 may be connected to a generator, instead of transmission to the front wheels 65a and 65b or to the rear wheels 65c and 65d. In this modified structure, the motor 50 may be driven with electric power generated by the generator or with electric power generated by the generator and accumulated in a battery. Namely the technique of the invention is also applicable to series hybrid vehicles. In the hybrid vehicle 20 of the embodiment, the power of the motor 50 is transmitted to the rear wheels 65c and 65d via the rear axle 66. The power of the motor 50 may alternatively be transmitted to the front wheels 65a and 65b. The belt-driven CVT 40 may be replaced by a toroidal CVT or a step transmission.

The disclosure of Japanese Patent Application No. 2006-138762 filed on May 18, 2006 including specification, drawings and claims are incorporated herein by reference in their entirety.

What is claimed is:

1. A vehicle, comprising:
   an internal combustion engine capable of outputting power;
   a motor capable of outputting at least a regenerative braking force to an axle of the vehicle;
   an accumulator unit that transmits electric power to and from the motor;
   a fluid pressure braking structure having a pressurization unit for pressurizing an operation fluid, the fluid pressure braking structure capable of outputting a braking force by utilizing an operational pressure of the operation fluid produced according to a driver's braking operation and a negative pressure produced by the internal combustion engine, and an increased pressure of the operation fluid produced by pressurization of the operation fluid by the pressurization unit;
   a braking force demand setting module that sets the braking force demand required by the driver in response to the driver's braking operation;
   a braking control module that controls the motor and the fluid pressure braking structure to satisfy the set braking force demand by a total of the regenerative braking force and the operational braking force when a sum of the regenerative braking force produced by the motor and an operational braking force based on the operational pressure is sufficient for the braking force demand set in response to the driver's braking operation, the braking control module controlling the motor and the fluid pressure braking structure to satisfy the set braking force demand by a total of the regenerative braking force, the operational braking force, and a braking force based on the increased pressure of the operation fluid when the sum of the regenerative braking force produced by the motor and the operational braking force based on the operational pressure is insufficient for the braking force demand set in response to the driver's braking operation;
   an operational pressure detection unit that detects the operational pressure;
   a negative pressure measurement unit that measures the negative pressure produced by the internal combustion engine; and
   a regenerative braking force setting module that sets a regenerative braking force obtainable by regeneration of the motor in response to the driver's braking operation,
   wherein the braking force demand setting module sets the braking force demand based on the detected operational pressure and the measured negative pressure, and
   wherein the braking control module controls the pressurization unit based on a result of subtraction of the set regenerative braking force and an operational braking force based on the detected operational pressure from the set braking force demand.

2. The vehicle in accordance with claim 1, wherein the regenerative braking force setting module sets the regenerative braking force obtainable by regeneration of the motor in response to the driver's braking operation based on a rotation speed of the motor and a state of charge of the accumulator unit.

3. The vehicle in accordance with claim 1, wherein the fluid pressure braking structure includes an operational pressure production unit that produces the operational pressure of the operation fluid according to the driver's braking operation and the negative pressure produced by the internal combustion engine, and wherein the pressurization unit pressurizes the operation fluid having the operational pressure generated by the operational pressure generation unit to increase the pressure of the operation fluid.

4. The vehicle in accordance with claim 1, wherein the internal combustion engine is capable of outputting power to a first axle, and wherein the motor is capable of inputting and outputting power from and to a second axle different from the first axle.

5. The vehicle in accordance with claim 4, the vehicle further comprising:
   a connection disconnection structure that connects and disconnects an output shaft of the internal combustion engine to and from the first axle, and wherein the connection disconnection structure disconnects the output shaft of the internal combustion engine from the first axle and an operation of the internal combustion engine is stopped when a predetermined condition is satisfied.

6. A control method of a vehicle, the vehicle including: an internal combustion engine capable of outputting power; a motor capable of outputting at least a regenerative braking force to an axle of the vehicle; an accumulator unit that transmits electric power to and from the motor; a fluid pressure braking structure having a pressurization unit for pressurizing an operation fluid, the fluid pressure braking structure capable of outputting a braking force by utilizing an operational pressure of the operation fluid produced according to a driver's braking operation and a negative pressure produced by the internal combustion engine, and an increased pressure of the operation fluid produced by pressurization of the operation fluid by the pressurization unit; an operational pressure detection unit that detects the operational pressure; and a negative pressure measurement unit that measures the negative pressure produced by the internal combustion engine, the control method comprising the steps of:
   controlling the motor and the fluid pressure braking structure to satisfy the set braking force demand by a total of the regenerative braking force and the operational braking force when a sum of the regenerative braking force produced by the motor and an operational braking force based on the operational pressure is sufficient for the braking force demand set in response to the driver's braking operation, and controlling the motor and the fluid pressure braking structure to satisfy the set braking force demand by a total of the regenerative braking force, the operational braking force, and a braking force based on the increased pressure of the operation fluid when the sum of the regenerative braking force produced by the motor and the operational braking force based on the operational pressure is insufficient for the braking force demand set in response to the driver's braking operation;

setting a regenerative braking force obtainable by regeneration of the motor in response to the driver's braking operation; and setting the braking force demand based on the detected operational pressure and the measured negative pressure, wherein the controlling step controlling the pressurization unit based on a result of subtraction of the set regenerative braking force and an operational braking force based on the detected operational pressure from the set braking force demand.

7. The control method of the vehicle in accordance with claim 6, the step of setting a regenerative braking force setting the regenerative braking force obtainable by regeneration of the motor in response to the driver's braking operation based on a rotation speed of the motor and a state of charge of the accumulator unit.

8. The control method of the vehicle in accordance with claim 6, wherein the fluid pressure braking structure includes an operational pressure production unit that produces the operational pressure of the operation fluid according to the driver's braking operation and the negative pressure produced by the internal combustion engine, and wherein the pressurization unit pressurizes the operation fluid having the operational pressure generated by the operational pressure generation unit to increase the pressure of the operation fluid.

9. The control method of the vehicle in accordance with claim 6, wherein the internal combustion engine is capable of outputting power to a first axle, and wherein the motor is capable of inputting and outputting power from and to a second axle different from the first axle.

10. The control method of vehicle in accordance with claim 9, the vehicle further includes a connection disconnection structure that connects and disconnects an output shaft of the internal combustion engine to and from the first axle, and wherein the connection disconnection structure disconnects the output shaft of the internal combustion engine from the first axle and an operation of the internal combustion engine is stopped when a predetermined condition is satisfied.

* * * * *